(12) United States Patent
Habib et al.

(10) Patent No.: US 8,149,154 B2
(45) Date of Patent: Apr. 3, 2012

(54) SYSTEM, METHOD, AND SOFTWARE FOR PERFORMING DUAL HYSTERESIS TARGET ASSOCIATION

(75) Inventors: Wassim S. Habib, Dover, MA (US); Yuchoi F. Lok, Framingham, MA (US)

(73) Assignee: Raytheon Company, Waltham, MA (US)

( * ) Notice: Subject to any disclaimer, the term of this patent is extended or adjusted under 35 U.S.C. 154(b) by 435 days.

(21) Appl. No.: 12/468,447

(22) Filed: May 19, 2009

(65) Prior Publication Data
US 2010/0295719 A1 Nov. 25, 2010

(51) Int. Cl.
*G01S 13/00* (2006.01)
*G01S 13/74* (2006.01)

(52) U.S. Cl. ............. 342/36; 342/37; 342/42; 342/43; 342/95

(58) Field of Classification Search ............. 342/36–40, 342/42–49, 94–97
See application file for complete search history.

(56) References Cited

U.S. PATENT DOCUMENTS

| | | | | |
|---|---|---|---|---|
| 4,345,257 A * | 8/1982 | Brunner | | 343/780 |
| 4,468,670 A * | 8/1984 | Suzuki et al. | | 343/727 |
| 5,712,785 A * | 1/1998 | Mok et al. | | 701/16 |
| 6,081,764 A * | 6/2000 | Varon | | 701/120 |
| 6,160,497 A * | 12/2000 | Clark | | 340/961 |
| 6,211,811 B1 * | 4/2001 | Evers | | 342/36 |
| 6,222,480 B1 * | 4/2001 | Kuntman et al. | | 342/30 |
| 6,512,975 B2 * | 1/2003 | Watson | | 701/120 |
| 6,594,578 B2 * | 7/2003 | Lai | | 701/120 |
| 6,617,997 B2 * | 9/2003 | Ybarra et al. | | 342/29 |
| 7,006,032 B2 * | 2/2006 | King et al. | | 342/29 |
| 7,026,979 B2 * | 4/2006 | Khosla | | 342/90 |
| 7,567,203 B2 * | 7/2009 | Dizaji et al. | | 342/90 |
| 7,804,981 B2 * | 9/2010 | Viggiano et al. | | 382/104 |
| 7,847,722 B2 * | 12/2010 | Ino | | 342/32 |

(Continued)

FOREIGN PATENT DOCUMENTS
WO  WO 2005/069250 A1  7/2005

(Continued)

OTHER PUBLICATIONS

"Primary Extractor System—TA10," Technical manual, IE intersoft electronics, retrieved from http://www.intersoft-electronics.com/Downloads/UserManuals/Radar%20Upgrades/IE-PSR-Extractor-TM-v14.pdf, Edition 1.4, 101 pages.

(Continued)

*Primary Examiner* — Thomas Tarcza
*Assistant Examiner* — Peter Bythrow
(74) *Attorney, Agent, or Firm* — Pierce Atwood LLP; Joseph M. Maraia

(57) ABSTRACT

In certain embodiments, a method includes receiving first track information comprising data for a particular aircraft track. The method further includes receiving a first radar plot comprising first location information corresponding to first aircraft identification information and first location information corresponding to second aircraft identification information. The method further includes associating the first aircraft identification information with the particular aircraft track. The method further includes accessing historical association information comprising a first association history variable corresponding to one or more previous associations between the first aircraft identification information and the particular aircraft track and a second association history variable corresponding to one or more previous associations between the second aircraft identification information and the particular aircraft track. The method further includes updating the first association history variable in response to the association of the first aircraft identification information with the particular aircraft track.

21 Claims, 8 Drawing Sheets

U.S. PATENT DOCUMENTS

| | | | |
|---|---|---|---|
| 2002/0004697 A1* | 1/2002 | Lai | 701/120 |
| 2005/0156777 A1* | 7/2005 | King et al. | 342/29 |
| 2007/0024494 A1* | 2/2007 | Dizaji et al. | 342/90 |
| 2008/0111731 A1* | 5/2008 | Hubbard et al. | 342/160 |
| 2010/0002077 A1* | 1/2010 | Viggiano et al. | 348/115 |
| 2010/0156698 A1* | 6/2010 | Baud et al. | 342/36 |
| 2010/0253566 A1* | 10/2010 | Ino | 342/32 |
| 2010/0295719 A1* | 11/2010 | Habib et al. | 342/36 |

FOREIGN PATENT DOCUMENTS

| | | |
|---|---|---|
| WO | WO 2006/088554 A1 | 8/2006 |

OTHER PUBLICATIONS

"PSR extractor," Switch to Master guide, IE intersoft electronics, retrieved from http://www.intersoft-electronics.com/Downloads/UserManuals/Radar%20Upgrades/IE-PCT791-Master_Slave_UM-v13.pdf, Edition 1.3, 13 pages.

"Primary Surveillance Radar Extractor," Control And Monitor-Cam-User Manual, IE intersoft electronics, retrieved from http://www.intersoft-electronics.com/Downloads/UserManuals/Radar%20Upgrades/IE-PSR-Extractor-UM-v16.pdf, Edition 1.6, 46 pages.

* cited by examiner

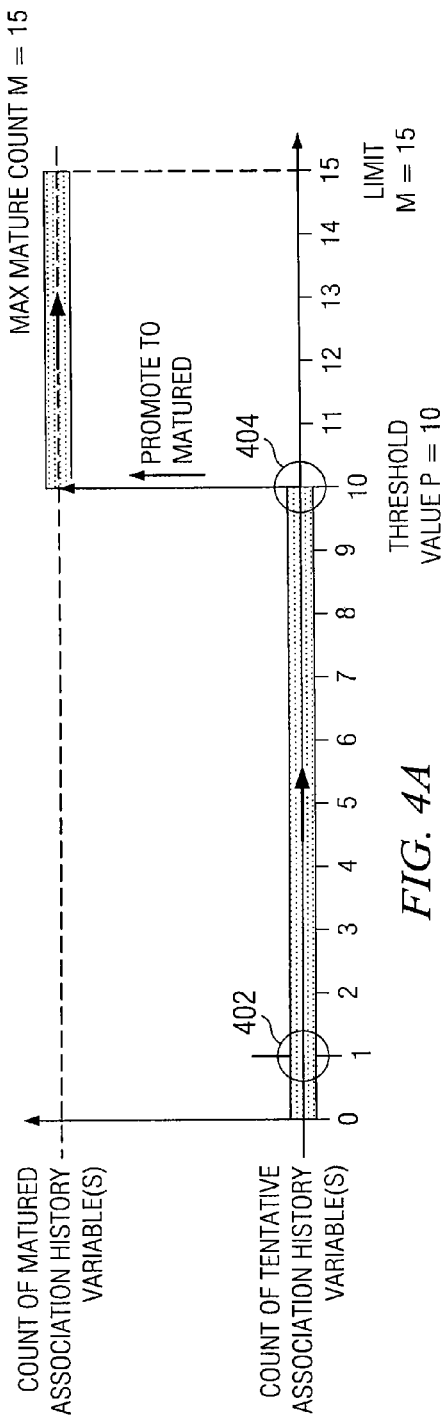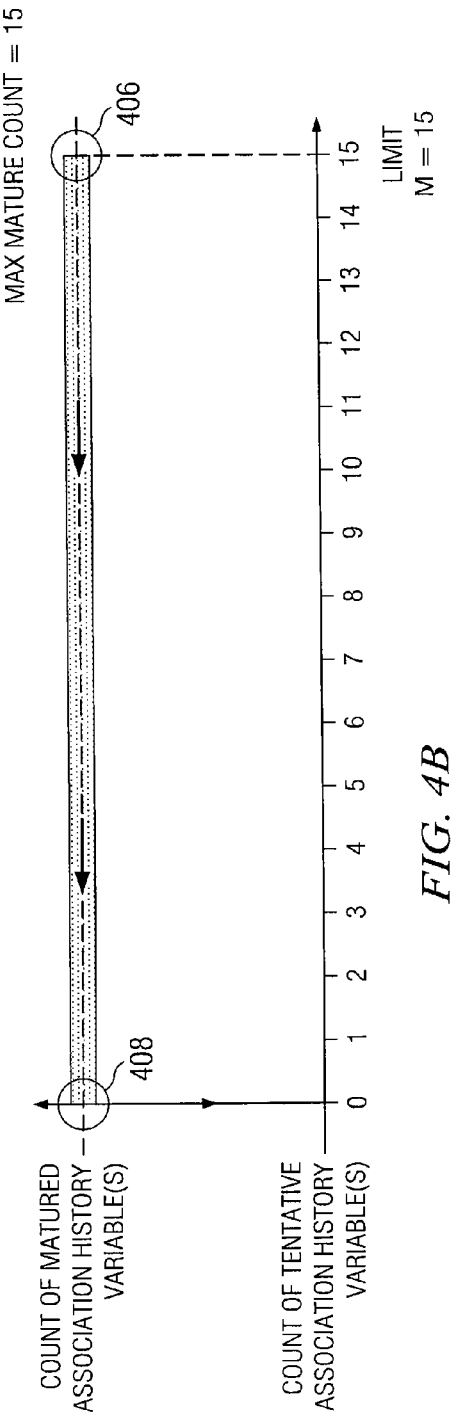
FIG. 4A
FIG. 4B

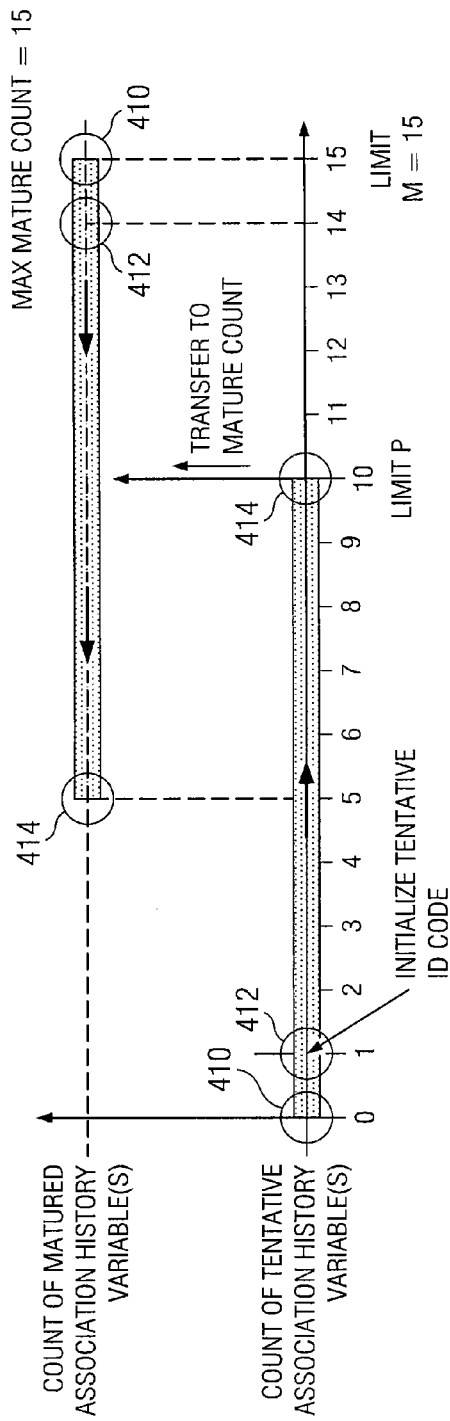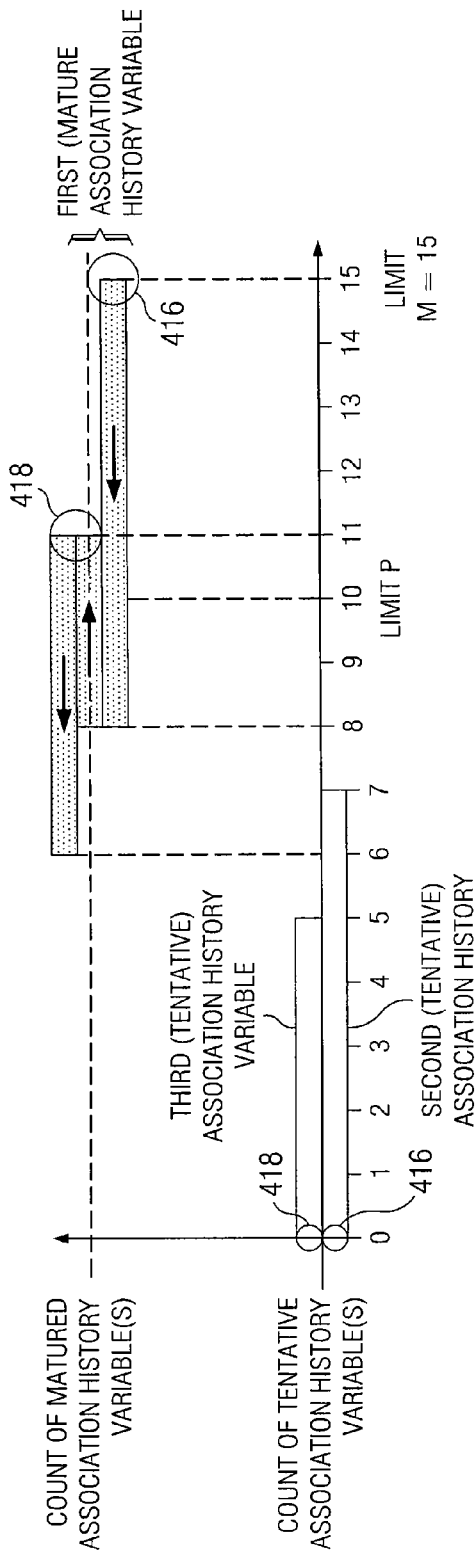

SYSTEM, METHOD, AND SOFTWARE FOR PERFORMING DUAL HYSTERESIS TARGET ASSOCIATION

GOVERNMENT FUNDING

The U.S. This invention was made with Government support under Contract No. FA8722-05-C-0001 awarded by the Department of the Air Force. The Government has certain rights in this invention.

TECHNICAL FIELD

This invention relates generally to radar systems and more particularly to a system, method, and software for performing dual hysteresis target association.

BACKGROUND

It is often beneficial to locate and/or identify aircraft in a particular airspace. For example, in air traffic control (ATC) applications, a ground based air traffic controller may seek to prevent mid-air collisions by organizing and directing the flow of air traffic. To organize and direct the flow of air traffic, the air traffic controller may locate and identify a number of aircraft in a particular airspace. To facilitate locating and/or identifying aircraft in a particular airspace, an ATC system may include one or more radar systems. As a particular example, an ATC system may include a primary surveillance radar (PSR) device (a.k.a. a "skin reflection" radar) operable to locate aircraft by emitting a radio signal and receiving a reflection of the emitted radio signal off aircraft fuselages (also known as a "skin returns"). As another particular example, an ATC system may further include a secondary surveillance radar (SSR) device operable to communicate interrogation requests to aircraft having one or more transponders, and the transponders may communicate a response to the interrogation signal. Based on the responses to interrogation requests, the SSR device may determine location information and identification information of the aircraft.

SUMMARY

According to the present invention, disadvantages and problems associated with previous techniques for performing target association may be reduced or eliminated.

In certain embodiments, a method includes receiving first track information comprising data for a particular aircraft track. The method further includes receiving a first radar plot comprising first location information corresponding to first aircraft identification information and first location information corresponding to second aircraft identification information. The method further includes associating the first aircraft identification information with the particular aircraft track. The method further includes accessing historical association information comprising a first association history variable corresponding to one or more previous associations between the first aircraft identification information and the particular aircraft track and a second association history variable corresponding to one or more previous associations between the second aircraft identification information and the particular aircraft track. The method further includes updating the first association history variable in response to the association of the first aircraft identification information with the particular aircraft track.

Particular embodiments of the present invention may provide one or more technical advantages. Radar systems such as those used in ATC applications may include both a PSR device generating PSR data (e.g., location information associated with one or more aircraft in a particular airspace) and an SSR device generating SSR data (e.g., identification information and location information associated with one or more aircraft in the particular airspace). It may de desirable to associate the location information of the PSR data with the identification information of the SSR data to generate associated radar data including both the location information associated with the one or more aircraft (from the PSR data) and the identification information associated with the one or more aircraft (from the SSR data). More particularly, it may be desirable to generate associated radar data by associating a particular PSR track (of track information generated based on the PSR data generated by the PSR device) with identification information of a particular SSR report (of SSR data generated by the SSR device). The associated radar data may then be used to generate a radar display such that a user of the radar system (e.g., an air traffic controller) may see both the location and identity of aircraft located in the particular airspace.

Certain embodiments of the present invention may account for one or more association history variables of a particular PSR track corresponding to previous associations between the particular PSR track and one or more SSR reports in associating the particular PSR a particular SSR report. More particularly, certain embodiments of the present invention may allow for a particular PSR track to be associated with a particular SSR report based at least in part on one or more association history variables associated with the particular PSR track. As a result, certain embodiments of the present invention may provide for more accurate associations (i.e., fewer incorrect associations) between PSR tracks and SSR reports location as compared to conventional association techniques (e.g., Least-Distance Association algorithm), particularly in high air traffic density applications (e.g., the airspace near an airport) and/or in applications having high SSR false target rates due to False-Replies Unsynchronized-In-Time (FRUIT).

Certain embodiments of the present invention may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 4A-4D illustrate changes in the values of a number of association history variables of a PSR track over time resulting from the application of the method for performing dual hysteresis target association described in FIG. 2 and FIGS. 3A-3C, according to certain embodiments of the present invention.

DESCRIPTION OF EXAMPLE EMBODIMENTS

Figure 1A:
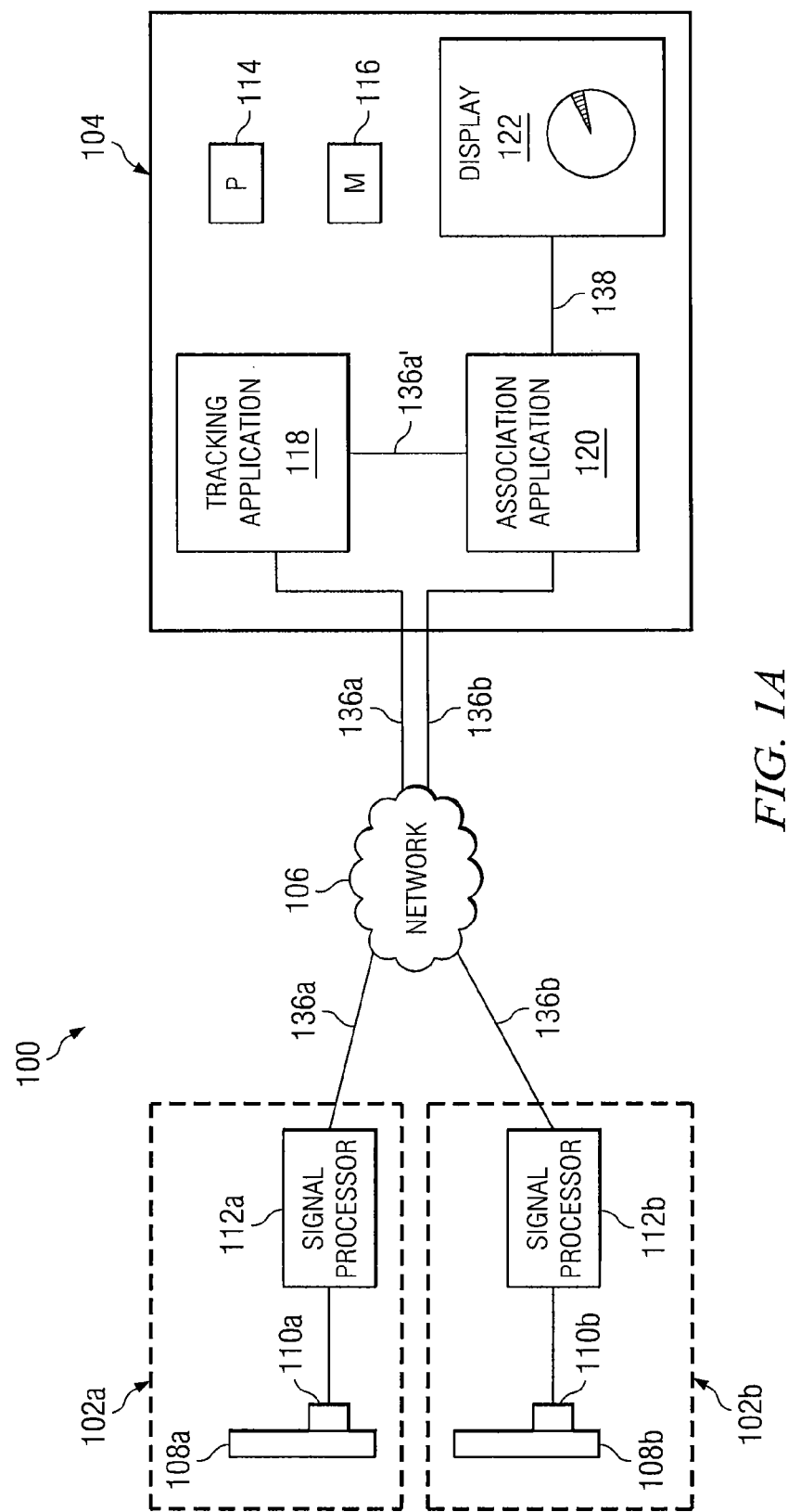
FIGS. 1A-1C illustrate an example system for performing dual hysteresis target association, according to certain embodiments of the present invention.
Figure 1B:
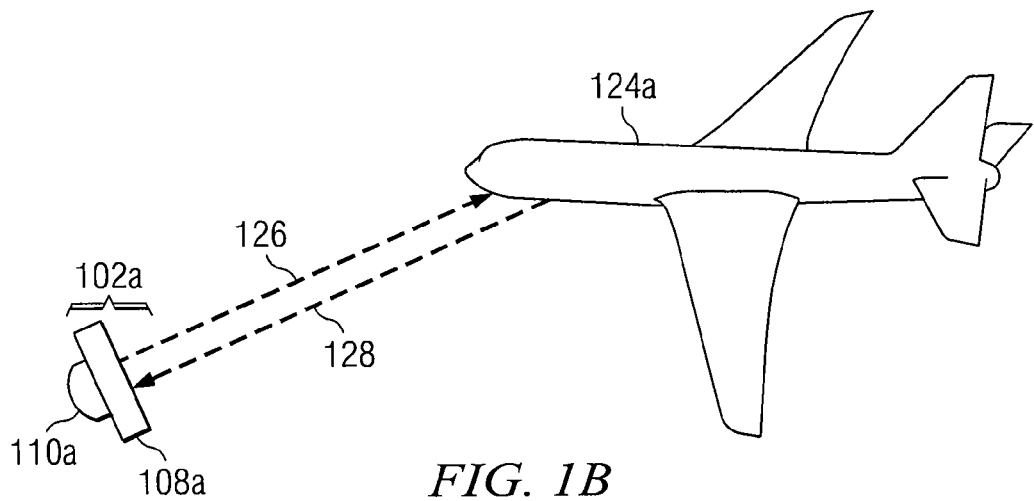
Figure 1C:
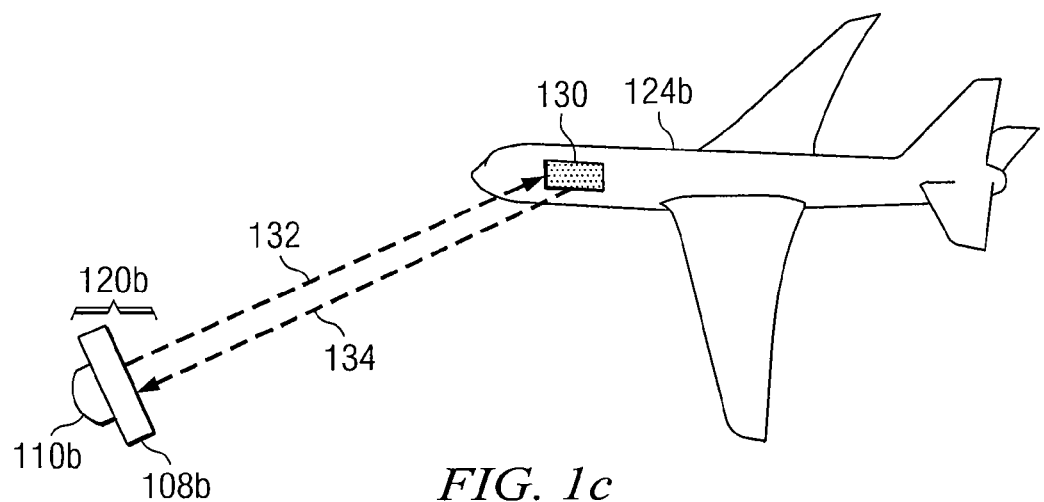

FIGS. 1A-1C illustrate an example system 100 for performing dual hysteresis target association, according to certain embodiments of the present invention. System 100 may include one or more radar devices 102, one or more radar processing systems 104, and network 106. Although this particular implementation of system 100 is illustrated and primarily described, the present invention contemplates any suitable implementation of system 100 according to particular needs. For simplicity, the one or more radar processing systems 104 of system 100 are referred to throughout this description primarily in the singular.

System 100 may include a first radar device 102a operable to generate track information comprising one or more aircraft tracks. System 100 may further include a second radar device 102b operable to generate radar plots comprising location information corresponding to identification information of one or more aircraft. In general, system 100 is operable to associate a particular aircraft track from track information generated by first radar device 102a with particular identification information from a radar plot generated by second radar device 102b based on a comparison of the particular aircraft track and the location information of the particular identification information and/or the historical associations between the particular aircraft track and identification information of one or more aircraft. Because system 100 may keep track of historical associations between the particular aircraft track and identification information for multiple (e.g., two) different aircraft to facilitate the association of the particular aircraft track with the particular identification information (as described in further detail below), system 100 may perform "dual hysteresis association." Certain embodiments of the present invention may provide for more accurate associations between track information generated by first radar device 102a and radar plots generated by second radar device 102b. Additional details of example embodiments of system 100 are described below.

Radar devices 102 of system 100 may each include a radar antenna 108, a radar receiver exciter 110, and a signal processor 112. Radar devices 102 may include any device operable to generate radar data comprising the identity, range, altitude, direction, and/or speed of moving and/or fixed objects in a particular coverage area. For example, radar devices 102 may be devices that use electromagnetic wave pulses to generate radar data comprising the identity, range, altitude, direction, and/or speed of aircraft in a particular airspace. Although particular radar devices 102 having particular components are illustrated and primarily described, the present invention contemplates any suitable radar devices 102 having any suitable components, according to particular needs.

For example, system 100 may include a first radar device 102a and a second radar device 102b. In certain embodiments, first radar device 102a and second radar device 102b may be associated with an ATC station in either a civilian or military context.

First radar device 102a may comprise a first antenna 108a, a first radar receiver exciter 110a, and a first signal processor 112a. First radar device 102a may have a corresponding first radar coverage area, the first radar coverage area being the airspace surrounding first radar device 102a out to a maximum range associated with first radar device 102a. First radar device 102a may be operable to generate first radar data comprising location information associated with one or more aircraft located in the first coverage area.

Second radar device 102b may comprise a second antenna 108b, a radar receiver exciter 110b, and a signal processor 112b. Second radar device 102b may have a corresponding second radar coverage area, the second radar coverage area being the airspace surrounding second radar device 102b out to a maximum range associated with second radar device 102b. Second radar device 102b may be operable to generate second radar data comprising identification information and location information associated with one or more aircraft located in the second coverage area.

Furthermore, a portion or all of the first coverage area of first radar device 102a may be the same as a portion of the second radar coverage area of second radar device 102b (i.e., the airspace surrounding first radar device 102a may overlap with the airspace surrounding second radar device 102b). As a result, one or more of the aircraft having associated location information in the first radar data may also have associated identification information and location information in the second radar data. For simplicity, it will be assumed throughout the remainder of this description that the first coverage area of first radar device 102a and the second radar coverage area of second radar device 102b are substantially the same (i.e., first radar device 102a and second radar device 102b are co-located and have the same maximum range). In other words, the one or more aircraft located in the first coverage area are generally the same as the one or more aircraft located in the second coverage area.

In certain embodiments, first radar device 102a is a PSR device, also known as a "skin reflection" radar device. Although the present invention contemplates first radar device 102a being any suitable radar device operable to generate location information (as described above), for purposes of simplicity and ease of understanding first radar device 102a will be referred to primarily as PSR device 102a throughout the remainder of the description. Similarly, first antenna 108a will be primarily referred to as PSR antenna 108a throughout the remainder of the description, first receiver exciter 110a will be primarily referred to as PSR receiver exciter 110a throughout the remainder of the description, and first signal processor 112a will be primarily referred to as PSR signal processor 112a throughout the remainder of the description.

PSR antenna 108a of first radar device 102a may be a monostatic antenna operable to emit and receive electromagnetic wave pulses generated by PSR receiver exciter 110a. PSR receiver exciter 110a may generate electromagnetic wave pulses having a particular frequency, the electromagnetic wave pulses emitted via PSR antenna 108a as PSR antenna 108a scans at a particular rate. For example, PSR antenna 108a may be a mechanical rotating antenna scanning at a rate of twelve revolutions per minute (RPM). As an additional example, PSR antenna 108a may be an electronic scan antenna scanning at a fixed revisit rate of 3 seconds. As PSR antenna 108a scans, PSR antenna 108a may emit electromagnetic wave pulses 126 generated by PSR receiver exciter 110a in a particular direction at a particular time.

As the electromagnetic wave pulses 126 emitted via PSR antenna 108a reflect off objects (e.g., aircraft 124a), the electromagnetic wave pulse reflections 128 may return to PSR antenna 108a (PSR antenna 108a being operable to receive electromagnetic wave pulse reflections 128, as described above). Each electromagnetic wave pulse reflection 128 received by PSR antenna 108a may have a signal strength corresponding to the amount of energy of the emitted electromagnetic wave pulse reflected by the reflecting object. As a result, PSR receiver exciter 110a may be operable to determine a strength for an electromagnetic wave pulse reflection 128 associated with an object (e.g., aircraft 124a) in a particular airspace (i.e., the airspace corresponding to the coverage area associated with PSR device 102a, described above).

Furthermore, PSR receiver exciter 110a may be operable to determine location information associated with each of the one or more objects (e.g., aircraft 124a) having associated electromagnetic wave pulse reflections 128 in the particular airspace. For example, in embodiments in which PSR device 102a is a two-dimensional PSR device, PSR receiver exciter 110a may be operable to determine a range for an object (e.g., by calculating the time interval between the time at which the electromagnetic pulse 126 is emitted by PSR antenna 108a and the time at which electromagnetic pulse reflection 128 is received by PSR antenna 108a) and an azimuth angle (i.e., direction relative to true north) for the object (e.g., based on the direction that electromagnetic wave pulse 126 was emitted by PSR antenna 108a and/or the direction electromagnetic wave pulse reflection 128 associated with the particular objects was received by PSR antenna 108a). Based on the determined range and azimuth angle associated with an object, PSR receiver exciter 110a may determine location information (e.g., X and Y coordinates) associated with the object.

Additionally, in embodiments in which PSR device 102a is a three-dimensional PSR device, PSR receiver exciter 110a may be further operable to determine an altitude for an object. Based on the determined range, azimuth angle, and altitude associated with an object, PSR receiver exciter 110a may determine location information (e.g., X, Y, and Z coordinates) associated with the object.

Thus, as PSR antenna 108a scans, PSR receiver exciter 110a may generate raw PSR data (e.g., an analog signal) including a plurality of voltages corresponding to a plurality of objects reflecting electromagnetic wave pulses 126 emitted via PSR antenna 108a in a particular airspace, the voltages being determined based on the strength of the reflected electromagnetic wave pulse, for example. Furthermore, raw PSR data may include location information (e.g., an X, Y, Z coordinate location) associated with each object reflecting electromagnetic wave pulses in the particular airspace.

PSR signal processor 112a may process the raw PSR data generated by PSR antenna 108a/PSR receiver exciter 110a to generate processed PSR data (e.g., a digital signal). For example, PSR signal processor 112a may filter the raw data to separate targets (e.g., aircraft 124a) from clutter (e.g., precipitation) on the basis of Doppler content and amplitude characteristics. PSR signal processor 112a may convert the raw data from analog data to digital data. Thus, in certain embodiments processed PSR data may comprise digital data corresponding to one or more aircraft 124a in a particular airspace, each of the one or more aircraft 124a having associated location information.

PSR device 102a may communicate processed PSR data to radar processing system 104 via network 106 (e.g., as a substantially continuous stream of data generated by PSR device 102a or as a discrete amount of data generated over a particular period of time). For example, PSR device 102a may communicate PSR plot 136a to radar processing system 104, PSR plot 136a corresponding to processed PSR data generated over one revolution of PSR antenna 108a. Furthermore, PSR plot 136a may comprise one or more PSR reports, a PSR report including digital data corresponding location information associated with a particular aircraft (e.g., a particular aircraft of the one or more aircraft in a particular airspace, as described above). In other words, PSR plot 136a may be communicated to radar processing system 104 for each three-hundred sixty degree revolution of PSR antenna 108a, each PSR plot 136a comprising a PSR report (including location information) for each of the one or more aircraft reflecting electromagnetic wave pulses 126 emitted over a three-hundred sixty degree revolution of PSR antenna 108b.

The above-described operation of PSR device 102a is intended as just one example of the operation of PSR device 102a and is not intended to limit the broad scope of the present invention.

In certain embodiments, second radar device 102b is an SSR device, also known as a "beacon radar" device or an "identification friend or foe (IFF)" radar device. Although the present invention contemplates second radar device 102b being any suitable radar device operable to generate identification and location information (as described above), for purposes of simplicity and ease of understanding second radar device 102b will be referred to primarily as SSR device 102b throughout the remainder of the description. Similarly, second antenna 108b will be primarily referred to as SSR antenna 108b throughout the remainder of the description, second receiver exciter 110b will be primarily referred to as SSR receiver exciter 110b throughout the remainder of the description, and second signal processor 112b will be primarily referred to as SSR signal processor 112b throughout the remainder of the description.

SSR antenna 108b of SSR device 102b may be a monostatic antenna operable to emit radio-frequency (RF) interrogation requests 132 generated by SSR receiver exciter 110b and receive interrogation request responses 134 (e.g., a response from a transponder 130 of an aircraft 124b). The interrogation requests 132 generated by SSR receiver exciter 110b may be emitted via SSR antenna 108b as SSR antenna 108b sweeps at a particular rate such that interrogation requests 132 are emitted for discrete angles covering three-hundred sixty degrees. For example, SSR antenna 108b may be a mechanical rotating antenna sweeping at a rate of twelve revolutions per minute (RPM). As an additional example, SSR antenna 108b may be an electronic scan antenna sweeping at a fixed revisit rate of 3 seconds.

The interrogation requests 132 generated by SSR receiver exciter 110b may have an associated mode. The mode associated with an interrogation request 132 may govern whether a transponder 130 of a particular aircraft 124b will generate an interrogation request response 134 and, if so, the identification information that will be included in the interrogation request response 134.

For example, transponders 130 of military aircraft 124b may respond to Mode 1, Mode 2, and Mode 4 interrogation requests 132. More particularly, a transponder 130 of a military aircraft 124b may respond to a Mode 1 interrogation request 132 with an interrogation request response 134 including identification information regarding the role, the mission, and/or the type of aircraft and a transponder 130 of a military aircraft 124b may respond to a a Mode 2 interrogation request 132 with an interrogation request response 134 including identification information related to the individual aircraft airframe (i.e., a number set in the aircraft, usually before take-off). A Mode 4 interrogation request 132 may be used by military aircraft for the IFF system, the mode 4 interrogation request 132 being encrypted such that only transponders 130 of aircraft 124b having the proper key may generate an interrogation request response 134 (such that "friendly" aircraft may be differentiated from "foe" aircraft).

As an additional example, transponders 130 of civilian aircraft 124b may respond to Mode 3/A and Mode C interrogation requests 132. More particularly, a transponder 130 of a civilian aircraft 124b may respond to a Mode 3/A interrogation request 132 with an interrogation request response 134 including identification information allocated by air traffic control authorities (e.g., an aircraft ID value set by the pilot of civilian aircraft 124b as directed by air traffic control instructions). Additionally, a transponder 130 of a civilian aircraft 124b may respond to a Mode C interrogation request 132 with an interrogation request response 134 including the flight level (i.e., altitude) of aircraft 124b.

Furthermore, SSR receiver exciter 110b may be operable to determine location information associated with an aircraft 124b having a transponder 130 communicating an interrogation request response 134. For example, SSR receiver exciter 110b may determine a range for aircraft 124b by calculating the time interval between the time at which the interrogation request 132 is emitted by SSR antenna 108b and the time at which interrogation request response 134 is received by SSR antenna 108b. Additionally, SSR receiver exciter 110b may be operable to determine an azimuth angle (i.e., direction relative to true north) to aircraft 124b based on the direction from which the interrogation request response 134 is received by SSR antenna 108b. Based on the determined range and azimuth angle associated with responding aircraft 124b, SSR receiver exciter 110b may determine location information (e.g., X, Y, and Z coordinates) associated with aircraft 124b.

Thus, as SSR antenna 108b sweeps, SSR receiver exciter 110b may generate raw SSR data (e.g., an analog signal) including identification information associated with one or more aircraft 124b in a particular airspace (i.e., identification information communicated by transponders 130 or aircraft 124b in an interrogation request response 134, the particular identification information being dependant on the Mode of the interrogation request 132). Furthermore, raw SSR data may contain location information associated with each of the one or more aircraft 124b communicating an interrogation request response.

SSR signal processor 112b may process the raw data generated by SSR antenna 108b/SSR receiver exciter 110b to generate processed SSR data (e.g., a digital signal). For example, SSR signal processor 112b may convert the raw data from analog data to digital data (e.g., a video signal). Thus, in certain embodiments processed SSR data may comprise digital data corresponding identification information (e.g., an aircraft ID) of one or more aircraft 124b in a particular airspace, each of the one or more aircraft having associated location information.

SSR device 102b may communicate the processed SSR data to radar processing system 104 via network 106 (e.g., as a substantially continuous stream of data or as a discrete amount of data generated over a particular period of time). For example, SSR device 102b may communicate SSR plot 136b to radar processing system 104, SSR plot 136b corresponding to processed SSR data generated over one revolution of SSR antenna 108b. Furthermore, SSR plot 136b may comprise one or more SSR reports, an SSR report including identification information (i.e., information contained in interrogation request responses 134, such as an aircraft ID) and location information associated with a particular aircraft 124b. In other words, an SSR plot 136b may be communicated to radar processing system 104 for each three-hundred sixty degree revolution of SSR antenna 108b, each SSR plot 136b comprising an SSR report (including identification information and location information) for each of the one or more aircraft responding to an interrogation request 132 emitted via SSR antenna 108b over a three-hundred sixty degree revolution of SSR antenna 108b.

The above-described operation of SSR device 102b is intended as just one example of the operation of SSR device 102a and is not intended to limit the broad scope of the present invention.

PSR device 102a and SSR device 102b may be coupled to radar processing system 104 via network 106. For example, PSR receiver exciter 110a of PSR device 102a may be operable to communicate PSR plot 136a (including one or PSR reports including location information corresponding to one or more aircraft) to radar processing system 104 via network 106. Similarly, SSR receiver exciter 110b of SSR device 102b may be operable to communicate SSR plot 136b (including one or more SSR reports including identification information and location information for one or more aircraft responding to interrogation requests emitted by SSR antenna 108b) to radar processing system 104 via network 106.

Network 106 facilitates wireless or wireline communication. Network 106 may communicate, for example, IP packets, Frame Relay frames, Asynchronous Transfer Mode (ATM) cells, voice, video, data, and other suitable information between network addresses. Network 106 may include one or more local area networks (LANs), radio access networks (RANs), metropolitan area networks (MANs), wide area networks (WANs), all or a portion of the global computer network known as the Internet, and/or any other communication system or systems at one or more locations.

Radar processing system 104 may include one or more computer systems operating at one or more locations. The one or more computer systems may include any appropriate input devices (such as a keypad, touch screen, mouse, or other device that can accept information), output devices, mass storage media, or other suitable components for receiving, processing, storing, and communicating data. Both the input device and output device may include fixed or removable storage media such as a magnetic computer disk, CD-ROM, or other suitable media to both receive input from and provide output to a user of radar processing system 104. Radar processing system 104 may include a personal computer, workstation, network computer, kiosk, wireless data port, personal data assistant (PDA), one or more processors within these or other devices, or any other suitable processing device.

"Radar processing system 104" and "user of radar processing system 104" may be used interchangeably. A user of radar processing system 104 may include, for example, a human user or a computer program or other suitable software module for automatically interacting with radar processing system 104. A particular example user of radar processing system 104 is an air traffic controller.

Radar processing system 104 may include a processing module 114, a memory module 116, a tracking application 118, an association application 120, and a display 122. Although certain functionality is described below as being associated with one or more applications of radar processing system 104, the present invention contemplates the functionality associated the with one or more applications of radar processing system 104 being combined or separated among any suitable number of applications according to particular needs. Furthermore, radar processing system 104 may include any suitable combination of hardware, firmware, and software.

Processing module 114 may include one or more microprocessors, controllers, or any other suitable computing devices or resources. Processing module 114 may work, either alone or with other components of system 100, to provide the functionality of system 100 described herein. Memory module 116 may take the form of volatile or non-volatile memory including, without limitation, magnetic media, optical media, random access memory RAM, ROM, removable media, or any other suitable memory component.

Tracking application 118 of radar processing system 104 may receive PSR plot 136a (including one or more PSR reports, each PSR report including location information of a particular aircraft) generated by PSR device 102a. Tracking application 118 may generate PSR track information 136a' that includes one or more PSR tracks (e.g., velocity vectors), each PSR track corresponding to a PSR report of PSR plot 136a. In other words, tracking application 118 may generate a PSR track based at least in part on the location information of each PSR report of PSR plot 136a.

For example, tracking application 118 may generate a PSR track corresponding to a particular PSR report of PSR plot 136a by comparing the location information of the particular PSR report with location information of a plurality of previously received PSR reports (i.e., PSR reports of previously received PSR plots 136a), the plurality of previously received PSR reports being stored at any suitable location in system 100 (e.g., memory module 116) such that they may be accessed by tracking application 118.

Based on the comparison, tracking application 118 may determine that the particular PSR report and one or more of the plurality of previously received PSR reports correspond to the same particular aircraft 124a (i.e., the location information of the one or more previously received PSR reports correspond to previous locations of the particular aircraft 124a to which the particular PSR report corresponds). In response to determining that the particular PSR report and one or more of the plurality of previously received PSR reports are associated with the same particular aircraft 124a, tracking application 118 may determine a PSR track associated with the particular aircraft 124a (i.e., a velocity vector including the heading and velocity of the particular aircraft 124a). Additionally, tracking application 118 may assign a track number to the PSR track associated with the particular aircraft 124a and store the PSR track and associated track number at any suitable location in system 100 (e.g., memory module 116) such that the track information can be accessed by tracking application 118 and/or association application 120 (as described below).

As another example, tracking application 118 may generate a PSR track for a particular PSR report of PSR plot 136a by comparing the location information of the particular PSR report with previously generated PSR tracks stored in memory module 116 (the previously generated PSR tracks having been generated as described above). Based on the comparison, tracking application 118 may determine that the particular PSR report and a previously generated PSR track correspond to the same particular aircraft 124a (i.e., the location information of the particular PSR report corresponds to a new location of the particular aircraft 124a to which the previously generated PSR track corresponds). In response to determining that the particular PSR report and the previously generated PSR track are associated with the same particular aircraft 124a, tracking application 118 may update the previously generated PSR track associated with the particular aircraft 124a and store the updated aircraft track in memory module 116.

Tracking application 118 may communicate the PSR track information 136a' (including one or more PSR tracks corresponding to the one or more PSR reports of PSR plot 136a, as described above) to association application 120. Additionally or alternatively, tracking application 118 may store PSR track information 136a' at any suitable location in system 100 (e.g., memory module 116) such that PSR track information 136a' may be accessed by association application 120.

Association application 120 of radar processing system 104 may receive PSR track information 136a' generated by tracking application 118. The track information 136a' may include one or more PSR tracks corresponding to the one or more PSR reports of PSR plot 136a. Association application 120 may also receive SSR plot 136b generated by SSR device 102b, SSR plot 136b comprising one or more SSR reports each comprising identification information (e.g., an aircraft ID) and location information associated with a particular aircraft of the one or more aircraft responding to interrogation requests emitted via SSR antenna 108b over a three-hundred sixty degree revolution of SSR antenna 108b, as described above.

Association application 120 may be operable to associate each SSR report (i.e., the identification information of the particular SSR report) of the received SSR plot 136b with a PSR track of the received PSR track information 136a'. In other words, association application 120 may associate the identification information (an aircraft ID) of each SSR report with a PSR track such that the identification information may be displayed to a user of radar processing system (e.g., an air traffic controller) along with the PSR track on display 122 (as described below).

For example, association application 120 may associate a particular SSR report of SSR plot 136b with a particular PSR track of PSR track information 136a' by determining the distance between the location information of the particular SSR report and the location of each PSR track of PSR track information 136a'. In other words, association application 120 may compare the location information of the particular SSR report of SSR plot 136b with each PSR track. Based on the comparison, association application 120 may associate the particular SSR report with a particular PSR track, the particular PSR track being the PSR track determined to be nearest the particular SSR report.

Although a particular method for associating each SSR report with a PSR track is primarily described (i.e., by determining the distance between a particular SSR report and the location of each PSR track of PSR track information 136a'), the present invention contemplates any suitable method for associating each SSR report with a PSR track. An additional or alternative particular method for associating each SSR report with a PSR track is described in further detail with regard to FIGS. 3A-3C, below.

Association application 120 may access historical association information including a plurality of association history variables, each associations history variable corresponding to one or more previous associations between a PSR track (i.e., a particular track number) and identification information of an SSR report (i.e., an aircraft ID). The historical association information may be stored at any suitable location in system 100 (e.g., memory module 116).

Association application 120 may determine one or more of the plurality of association history variables of the particular PSR track with which the particular SSR report is associated (i.e., association history variables corresponding to previous associations between the PSR track and identification information of one or more previously received SSR reports). Association application 120 may identify the one or more association history variables of the particular PSR track by determining those association history variables having a corresponding track number-aircraft ID combination including the track number of the particular PSR track.

Furthermore, the one or more association history variables of the particular PSR track may each have a classification based on a value of the association history variable. For example, if the value of an accessed association history variable is greater than or equal to a threshold value, the association history variable may be classified as mature. Similarly, if the value of an accessed maturity assessment variable is less than the threshold value, the association history variable may be classified as tentative.

Association application 120 may update each of the one or more accessed association history variables of the particular PSR track in response to the association of the particular SSR report with the particular PSR track.

For example, association application 120 may update the value of each of the one or more accessed association history variables. More particularly, association application 120 may increment the value of the accessed association history variable corresponding to associations between the particular PSR track and the particular SSR report (i.e., the association history variable having a corresponding track number-aircraft ID combination including the aircraft ID of the particular SSR report and the track number of the particular PSR track). If the accessed one or more association history variables corresponding to the particular SSR report do not include an association history variables corresponding to associations between the particular SSR report and the particular PSR track, association application 120 may create a new association history variable corresponding to associations between the particular PSR track and the particular SSR report.

Additionally, association application 120 may decrement the value(s) of the accessed association history variable(s) of the particular PSR track (i.e., accessed association history variable(s) corresponding to associations between the particular PSR track and the SSR report(s) other than the particular SSR report)

Additionally, association application 120 may update the classification of each of the one or more accessed association history variables of the particular PSR track in response to the increase or decrease of the value of each association history variable. For example, association application 120 may determine whether the value of each accessed association history variable is either greater than or equal to a threshold value (in which case the association history variable is classified as mature) or less than the threshold value (in which case the association history variable is classified as tentative).

In response to associating each SSR report of the received SSR plot 136b with a PSR track of the received PSR track information 136a' and updated each association history variable accordingly (as described above), association application 120 may store the updated association history variables as association history information (e.g., in memory module 116) such that they can be accessed and updated in response to the receipt of subsequent PSR track information 136a' and subsequent SSR plots 136b.

Additionally, association application 120 may generate associated radar data 138. Associated radar data 138 may include each PSR track of PSR track information 136a'. Additionally, associated radar data 138 may include location information to be displayed with each PSR track on radar display 122 (as described in further detail below). The location information to be displayed with a particular PSR track may include the identification information of an association history variable of the particular PSR track having a mature classification. If there is no association history variable of the particular PSR track having a mature classification, the location information to be displayed with the particular PSR track may be the identification information of the SSR report of SSR plot 130b with which the particular PSR track was associated by association application 120. Association application 120 may communicate the generated associated radar data 138 to radar display 122.

Radar display 122 of radar processing system 104 may include a monitor operable to generate a display corresponding to all or part of the coverage area associated with PSR device 102a and/or SSR device 102b. For example, radar display 122 may be a Cathode Ray Tube (CRT) display, an LCD monitor, or a plasma monitor. Radar display 122 may be operable to receive associated radar data 138 from association application 120 and generate a display including each PSR track (i.e., a velocity vector) of associated radar data 138, each PSR track being located on a portion of the display corresponding to the location of the PSR track. Additionally, each PSR track of the generated display may be labeled with all or part of the identification information of the SSR report associated with the PSR track by association application 120 (as described above). In other words, radar display 122 may be operable to display each PSR track of PSR track information 136a' along with appropriate aircraft identification information (from SSR plot 136b as determined by association application 120, as described above), the display corresponding to a snapshot of a particular airspace at a particular time (i.e., the time over which PSR radar device 102a and SSR radar device 102b generated PSR plot 136a and SSR plot 136b, respectively, as described above).

FIG. 1 merely provides one example of computers that may be used with the invention. The present invention contemplates computers other than general purpose computers as well as computers without conventional operating systems. As used in this document, the term "computer" is intended to encompass a personal computer, workstation, network computer, a portable computing device, or any other suitable processing device. Furthermore, each computer system of system 100 may include one or more processing modules and one or more memory modules. A processing module may include one or more microprocessors, controllers, or any other suitable computing devices or resources. Processing modules may work, either alone or with other components of system 100, to provide the functionality of system 100 described herein. Each memory module may take the form of volatile or non-volatile memory including, without limitation, magnetic media, optical media, RAM, ROM, removable media, or any other suitable memory component.

Although a particular number of components of system 100 have been illustrated and primarily described, the present invention contemplates system 100 including any suitable number of such components. Furthermore, the various components of system 100 described above may be local or remote from one another and may be implemented in any suitable combination of hardware, firmware, and software.

In operation of an example embodiment of system 100, association application 120 receives first track information comprising data for a particular aircraft track. For example, association application 120 may receive PSR track information 136a' corresponding to PSR plot 136a generated by PSR device 102a over one revolution of PSR antenna 108a, PSR track information 136a' including a particular PSR track having a particular track number.

Association application 120 also receives a first radar plot comprising first location information corresponding to first aircraft identification information and first location information corresponding to second aircraft identification information. For example, association application 120 may receive SSR plot 136b generated by SSR device 102b over one revolution of SSR antenna 108b, SSR plot 136b including the first SSR report comprising first location information corresponding to first identification information (e.g., an aircraft ID of a first aircraft) and the second SSR report comprising first location information corresponding to second identification information (e.g., an aircraft ID of a second aircraft).

Association application 120 associates the first aircraft identification information with the particular aircraft track. For example, association application 120 may associate the first SSR report (comprising the first identification information) of the received SSR plot 136b with the particular PSR track of the received PSR track information 136a'. In other words, association application 120 may associate the first identification information (i.e., the aircraft ID of the first aircraft) of the first SSR report with the particular PSR track. As a particular example, association application 120 may associate the first SSR report of SSR plot 136b with the particular PSR track of PSR track information 136a' by determining the distance between the first SSR report and the location of each PSR track of the plurality of PSR tracks of the received PSR track information 136a', the particular PSR track being the PSR track determined to be nearest the first SSR report.

Association application 120 accesses historical association information comprising a first association history variable corresponding to previous associations between the first aircraft identification information and the particular aircraft track and a second association history variable corresponding to previous associations between the second aircraft identification information and the particular aircraft track.

For example, association application 120 may access historical association information corresponding to previous associations between PSR tracks and SSR reports (i.e., from previously received PSR track information 136a' and SSR plots 136b), the historical association information including a first association history variable corresponding to previous associations between the first identification information of the first SSR report (i.e., the aircraft ID of the first aircraft) and the particular PSR track (i.e., the particular track number of the particular PSR track) and a second association history variable corresponding to previous associations between the second identification information of the second SSR report (i.e., the aircraft ID of the second aircraft) and the particular PSR track (i.e., the particular track number of the particular PSR track).

Additionally, the first association history variable may have a value corresponding to the previous associations between the first identification information (i.e., the aircraft ID of the first aircraft) and the particular aircraft track (i.e., previously received PSR tracks having the same particular track number as the particular PSR track) and the second association history variable may have a value corresponding to the previous associations between the second identification information (i.e., the aircraft ID of the second aircraft) and the particular aircraft track (i.e., previously received PSR tracks having the same particular track number as the particular PSR track). In other words, the first association history variable may have a value corresponding to the particular track number-first aircraft ID combination and the second association history variable may have a value corresponding to the particular track number-second aircraft ID combination.

Association application 120 updates the first association history variable in response to the association of the first aircraft identification information with the particular aircraft track. For example, association application 120 may increase the value of the first association history variable (corresponding to the particular track number-first aircraft ID combination) in response to the association of the first SSR report (i.e., aircraft ID of the first aircraft) with the particular aircraft track.

In certain embodiments, association application 120 updates the second association history variable in response to the association of the first aircraft identification information with the particular aircraft track. For example, association application 120 may decrease the value of the second association history variable (corresponding to the particular track number-second aircraft ID combination) in response to the association of the first SSR report (i.e., aircraft ID of the first aircraft) with the particular aircraft track.

Additionally, association application 120 may update a classification of the accessed first and second association history variables in response to the increase or decrease of the values of the accessed first and second association history variables. For example, association application 120 may determine whether the value of the first association history variable (having been increased, as described above) is either greater than or equal to a threshold value (in which case the association history variable is classified as mature) or less than the threshold value (in which case the association history variable is classified as tentative). Similarly, association application 120 may determine whether the value associated with the second association history variable (having been decreased, as described above) is either greater than or equal to the threshold value (in which case the association history variable is classified as mature) or less than the threshold value (in which case the association history variable is classified as tentative).

Particular embodiments of the present invention may provide one or more technical advantages. Radar systems such as those used in ATC applications may include both a PSR device generating PSR data (e.g., location information associated with one or more aircraft in a particular airspace) and an SSR device generating SSR data (e.g., identification information and location information associated with one or more aircraft in the particular airspace). Because the location information associated with the one or more aircraft of the PSR data may be more accurate and/or reliable than the location information associated with the one or more aircraft of the SSR data, it may be desirable to associate the location information of the PSR data with the identification information of the SSR data to generate associated radar data including both the location information associated with the one or more aircraft (from the PSR data) and the identification information associated with the one or more aircraft (from the SSR data). More particularly, it may be desirable to generate associated radar data by associating a particular PSR track (of track information generated based on the PSR data generated by the PSR device) with identification information of a particular SSR report (of SSR data generated by the SSR device). The associated radar data may then be used to generate a radar display such that a user of the radar system (e.g., an air traffic controller) may see both the location and identity of aircraft located in the particular airspace.

Certain embodiments of the present invention may account for one or more association history variables of a particular PSR track corresponding to previous associations between the particular PSR track and one or more SSR reports in associating the particular PSR a particular SSR report. More particularly, certain embodiments of the present invention may allow for a particular PSR track to be associated with a particular SSR report based at least in part on one or more association history variables associated with the particular PSR track. As a result, certain embodiments of the present invention may provide for more accurate associations (i.e., fewer incorrect associations) between PSR tracks and SSR reports location as compared to conventional association techniques (e.g., Least-Distance Association algorithm), particularly in high air traffic density applications (e.g., the airspace near an airport) and/or in applications having high SSR false target rates due to False-Replies Unsynchronized-In-Time (FRUIT).

Figure 2:
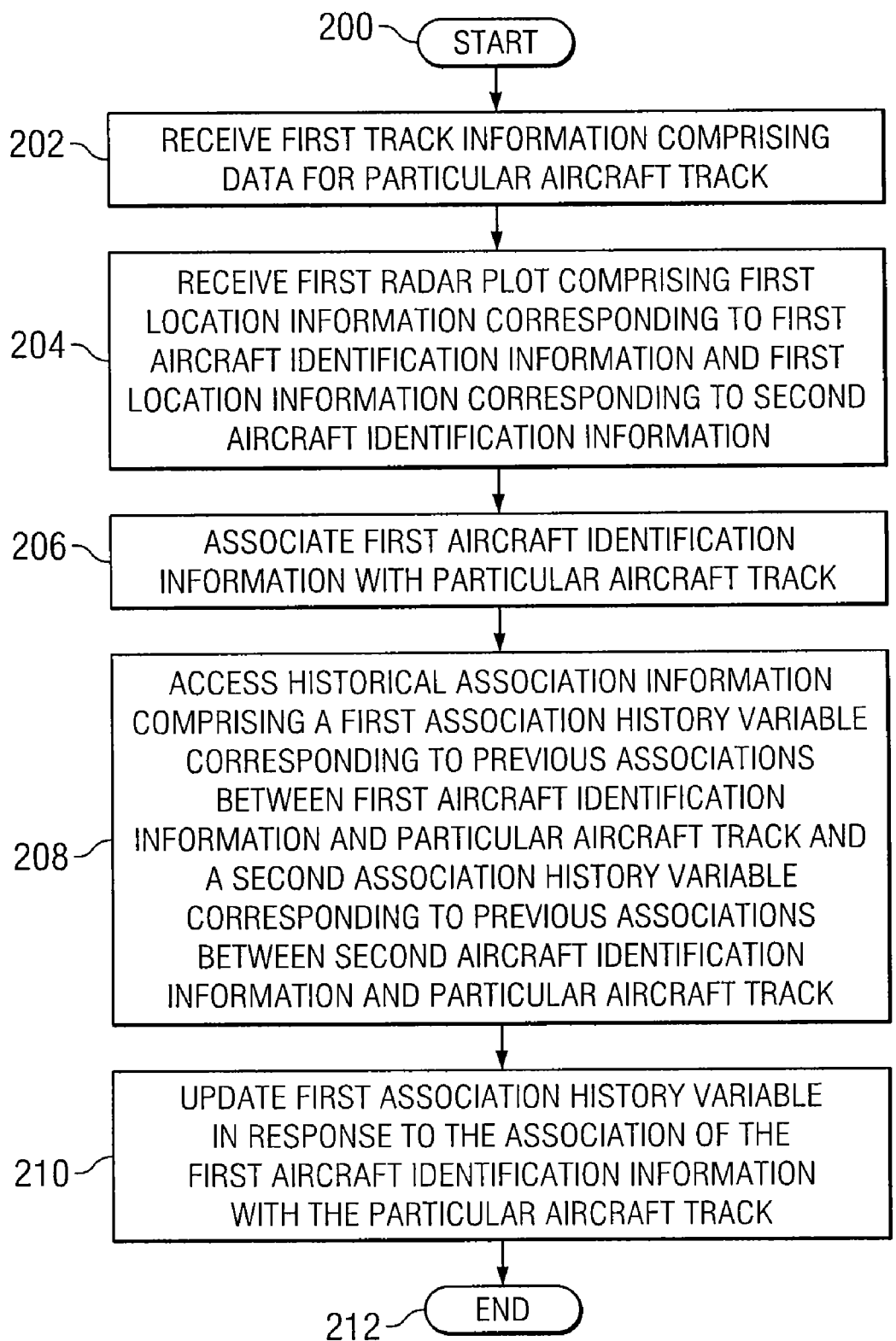
FIG. 2 illustrates an example method for performing dual hysteresis target association, according to certain embodiments of the present invention.

FIG. 2 illustrates an example method for performing dual hysteresis target association, according to certain embodiments of the present invention. The method begins at step 200. At step 202, association application 120 receives first track information comprising data for a particular aircraft track. For example, association application 120 may receive PSR track information 136a' corresponding to PSR plot 136a generated by PSR device 102a over one revolution of PSR antenna 108a, as described above. Furthermore, PSR track information 136a' may include a plurality of PSR tracks, the plurality of PSR track including a particular PSR track having a particular track number.

At step 204, association application 120 receives a first radar plot comprising first location information corresponding to first aircraft identification information and first location information corresponding to second aircraft identification information. For example, association application 120 may receive SSR plot 136b generated by SSR device 102b over one revolution of SSR antenna 108b, as described above. Furthermore, SSR plot 136b may include a plurality of SSR reports, the plurality of SSR reports including the first SSR report comprising first location information corresponding to first identification information (e.g., an aircraft ID of a first aircraft) and the second SSR report comprising first location information corresponding to second identification information (e.g., an aircraft ID of a second aircraft).

At step 206, association application 120 associates the first aircraft identification information with the particular aircraft track. For example, association application 120 may associate the first SSR report (comprising the first identification information) of the received SSR plot 136b with the particular PSR track of the received PSR track information 136a'. In other words, association application 120 may associate the first identification information (i.e., the aircraft ID of the first aircraft) of the first SSR report with the particular PSR track. As a particular example, association application 120 may associate the first SSR report of SSR plot 136b with the particular PSR track of PSR track information 136a' by determining the distance between the first SSR report and the location of each PSR track of the plurality of PSR tracks of the received PSR track information 136a', the particular PSR track being the PSR track determined to be nearest the first SSR report.

At step 208, association application 120 accesses historical association information comprising a first association history variable corresponding to previous associations between the first aircraft identification information and the particular aircraft track and a second association history variable corresponding to previous associations between the second aircraft identification information and the particular aircraft track.

For example, association application 120 may access historical association information corresponding to previous associations between PSR tracks and SSR reports (i.e., from previously received PSR track information 136a' and SSR plots 136b), the historical association information including a first association history variable corresponding to previous associations between the first identification information of the first SSR report (i.e., the aircraft ID of the first aircraft) and the particular PSR track (i.e., the particular track number of the particular PSR track) and a second association history variable corresponding to previous associations between the second identification information of the second SSR report (i.e., the aircraft ID of the second aircraft) and the particular PSR track (i.e., the particular track number of the particular PSR track).

Additionally, the first association history variable may have a value corresponding to the previous associations between the first identification information (i.e., the aircraft ID of the first aircraft) and the particular aircraft track (i.e., previously received PSR tracks having the same particular track number as the particular PSR track) and the second association history variable may have a value corresponding to the previous associations between the second identification information (i.e., the aircraft ID of the second aircraft) and the particular aircraft track (i.e., previously received PSR tracks having the same particular track number as the particular PSR track). In other words, the first association history variable may have a value corresponding to the particular track number-first aircraft ID combination and the second association history variable may have a value corresponding to the particular track number-second aircraft ID combination.

At step 210, association application 120 updates the first association history variable in response to the association of the first aircraft identification information with the particular aircraft track. For example, association application 120 may increase the value of the first association history variable (corresponding to the particular track number-first aircraft ID combination) in response to the association of the first SSR report (i.e., aircraft ID of the first aircraft) with the particular aircraft track.

In certain embodiments, association application 120 updates the second association history variable in response to the association of the first aircraft identification information with the particular aircraft track. For example, association application 120 may decrease the value of the second association history variable (corresponding to the particular track number-second aircraft ID combination) in response to the association of the first SSR report (i.e., aircraft ID of the first aircraft) with the particular aircraft track.

Additionally, association application 120 may update a classification of the accessed first and second association history variables in response to the increase or decrease of the values of the accessed first and second association history variables. For example, association application 120 may determine whether the value associated with the first association history variable (having been increased, as described above) is either greater than or equal to a threshold value (in which case the association history variable is classified as mature) or less than the threshold value (in which case the association history variable is classified as tentative). Similarly, association application 120 may determine whether the value associated with the second association history variable (having been decreased, as described above) is either greater than or equal to the threshold value (in which case the association history variable is classified as mature) or less than the threshold value (in which case the association history variable is classified as tentative).

Figure 3A:
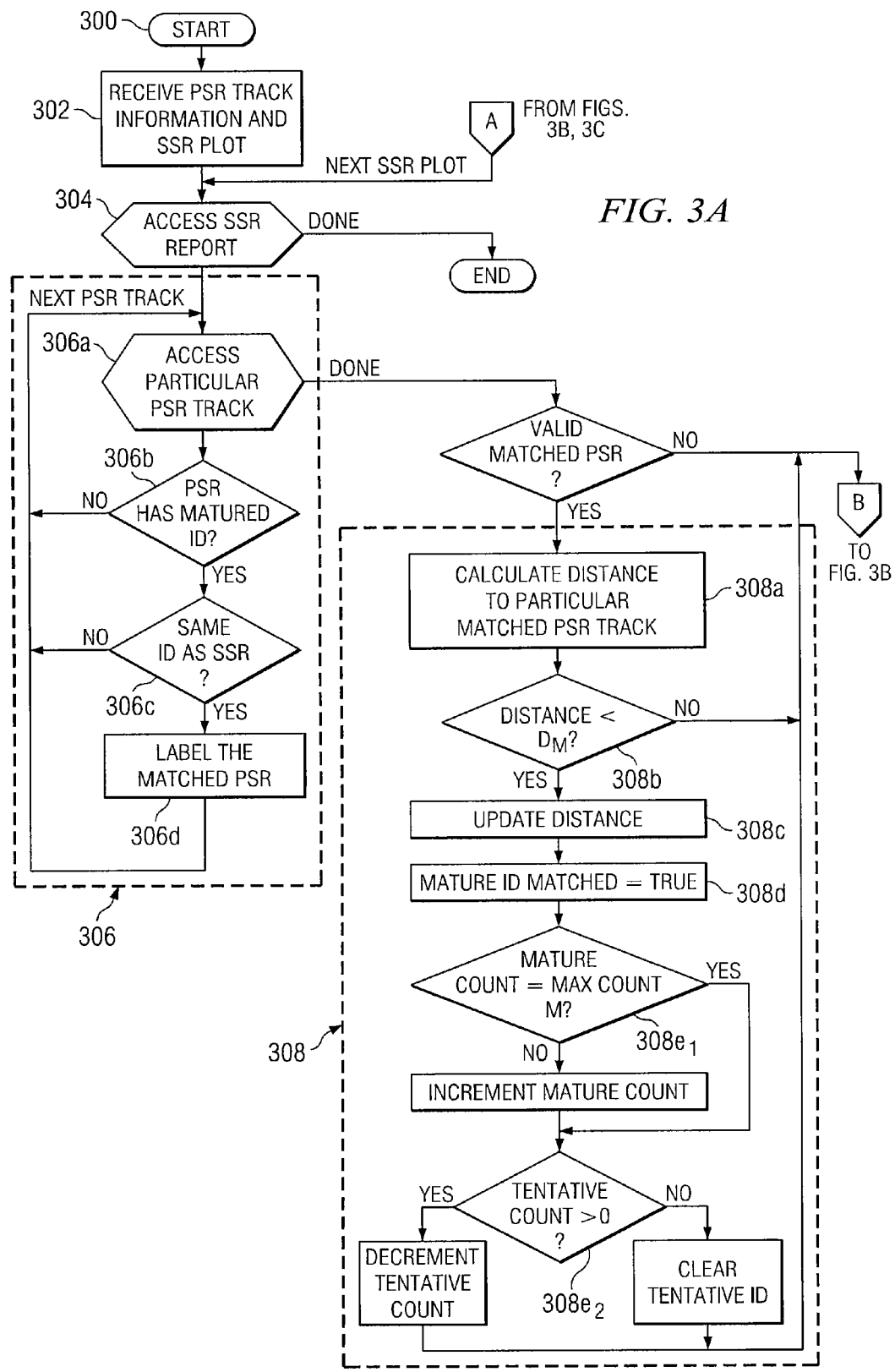
FIGS. 3A-3C illustrate an example method for performing dual hysteresis target association whereby each SSR report of an SSR plot may be associated with a particular PSR track of PSR track information, according to certain embodiments of the present invention.
Figure 3B:
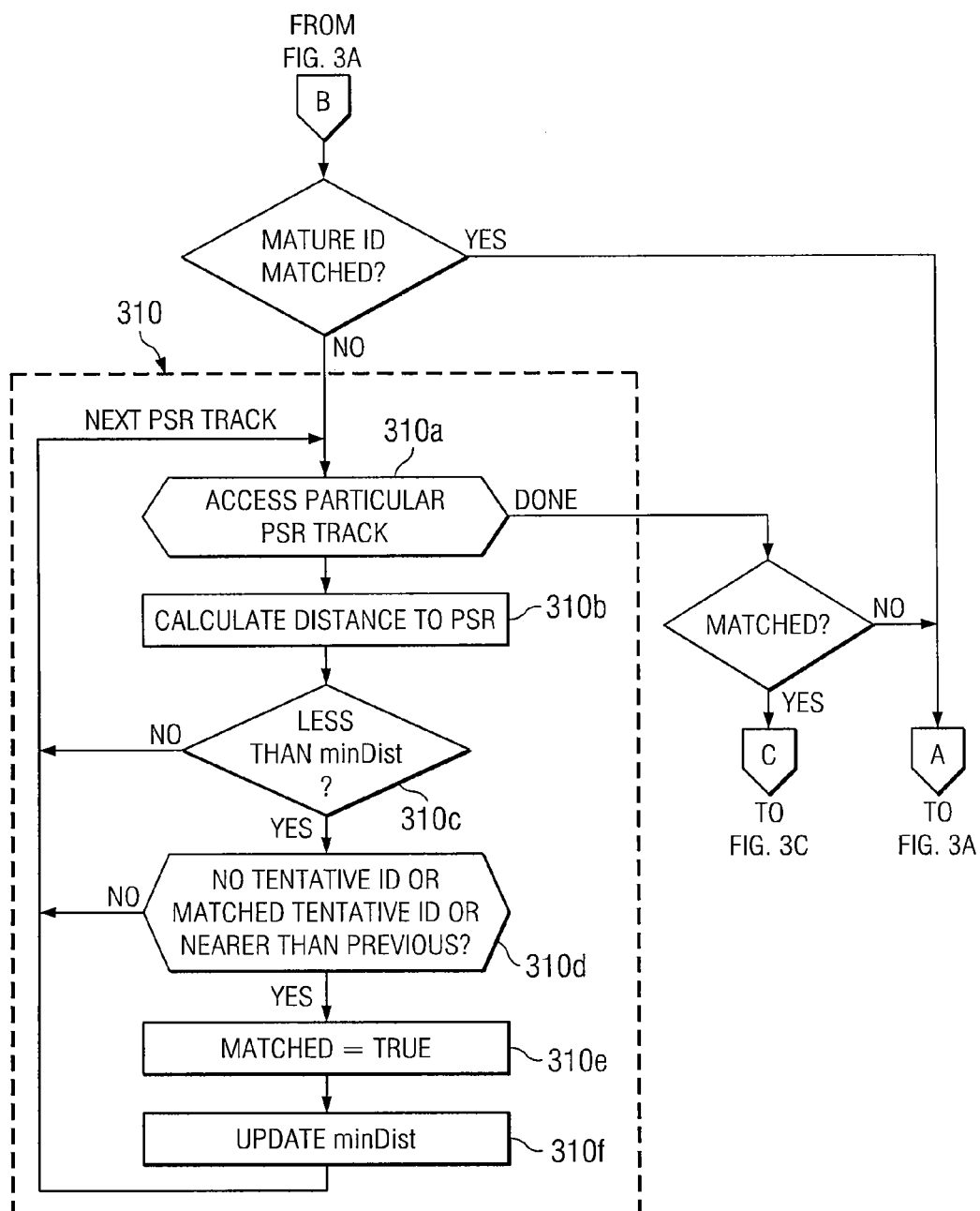
Figure 3C:
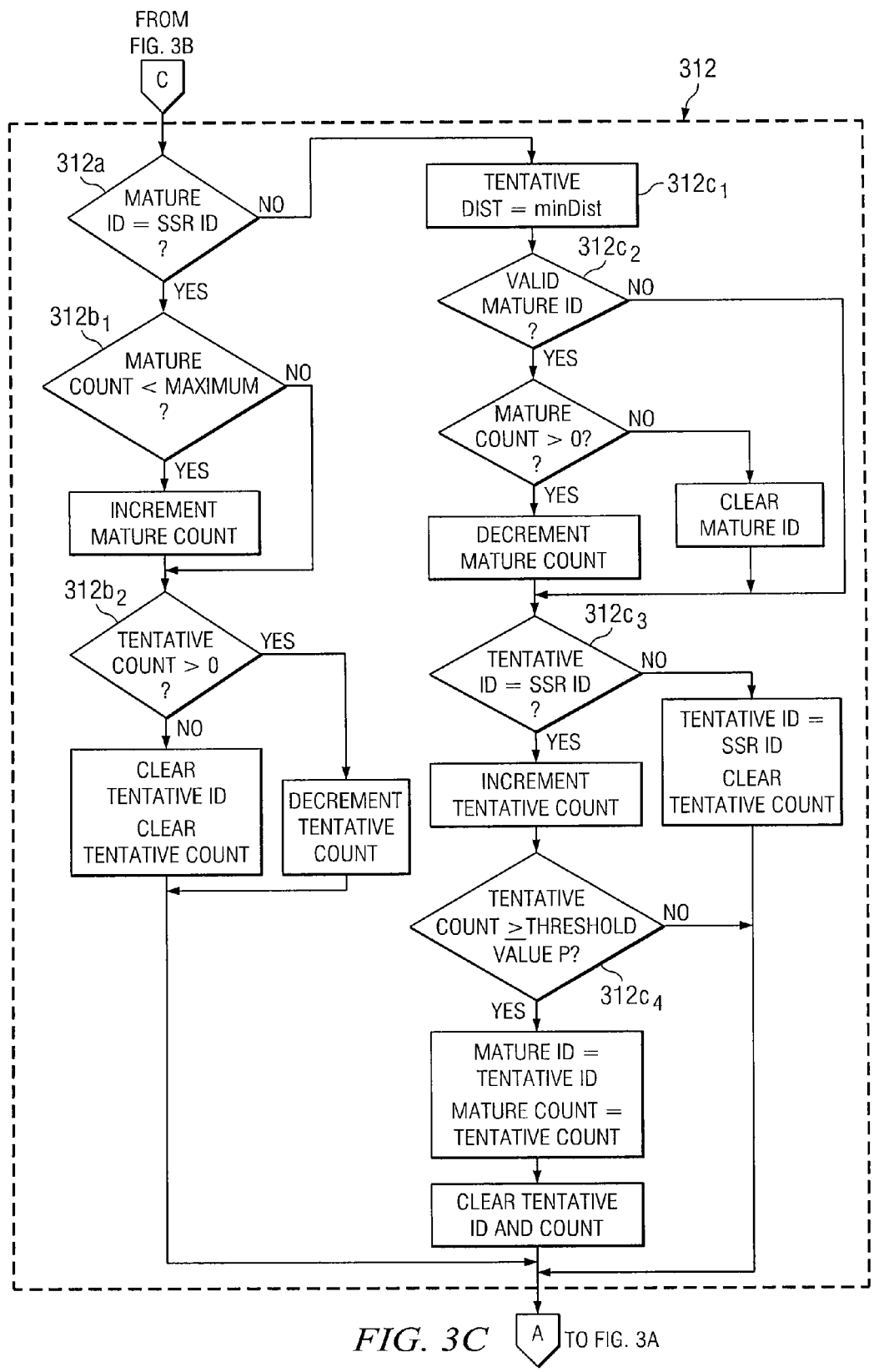

FIGS. 3A-3C illustrate an example method for performing dual hysteresis target association whereby each SSR report of an SSR plot 136b may be associated with a particular PSR track of PSR track information 136a', according to certain embodiments of the present invention. The method begins at step 300. At step 302, association application 120 receives PSR track information 136a' (including a plurality of PSR tracks) and an SSR plot 136b (including a plurality of SSR reports). At step 304, association application 120 accesses a particular SSR report of the received SSR plot 136b.

At step 306, association application 120 compares the accessed particular SSR report with each PSR track of PSR track information 136a' to determine matched PSR tracks, matched PSR tracks being PSR tracks having mature association history variables corresponding to previous associations with the identification information of the accessed particular SSR report (i.e., aircraft ID of the accessed particular SSR report). More particularly, at step 306a association application 120 accesses a particular PSR track and those association history variables of the particular PSR track of the association history information (e.g., from memory module 116). At step 306b association application 120 determines if the accessed association history variables of the particular PSR track include a mature association history variable. If the accessed association history variables of the particular PSR track do not include a mature association history variable, the method returns to step 306a and association application 120 accesses another PSR track. If the accessed association history variables of the particular PSR track do include a mature association history variable, the method continues to step 306c.

At step 306c association application 120 determines if the mature association history variable of the particular PSR track corresponds to previous associations between the particular PSR track and the identification information (e.g., an aircraft ID) of the particular SSR report. If it is determined that the mature association history variable of the particular PSR track does not correspond to previous associations between the particular PSR track and the identification information of the particular SSR report, the method returns to step 306a and association application 120 accesses another PSR track. If it is determined that the mature association history variable of the particular PSR track does correspond to previous associations between the particular PSR track and the identification information of the particular SSR report, the method continues to step 306d. At step 306d association application 120 labels the particular PSR track as a matched PSR track.

At step 308, association application 120 determines if the distance between the particular SSR report (i.e., a location indicated by the location information of the particular SSR report) and any matched PSR tracks identified in step 306 is less than a threshold minimum distance $D_m$ (which may be predefined to be any suitable distance). More particularly, at step 308a association application 120 determines the distance between the particular SSR report and a particular matched PSR track. At step 308b association application 120 determines if the distance between the particular matched PSR track and the particular SSR report is less than a distance $D_m$. If it is determined that the distance between the particular matched PSR track and the particular SSR report is not less than distance $D_m$, the method returns to step 308a and association application 120 determines the distance between the particular SSR report and another matched PSR track.

If it is determined that the distance between the particular matched PSR track and the particular SSR report is less than the distance $D_m$, the method continues to step 308c. At step 308c association application 120 updates the distance $D_m$ to be equal to the determined distance between the particular matched PSR track and the particular SSR report. At step 308d association application 120 determines that the particular SSR report is associated with the particular matched PSR track.

At step 308e association application 120 accesses and updates each association history variable of the particular matched PSR track. More particularly, at step 308e₁ association application 120 determines if the value of the accessed mature association history variable of the particular matched the PSR track (i.e., the association history variable of the particular matched PSR track corresponding to previous association with the particular SSR report) is less than a maximum value M (which may be predefined as any suitable value). If the value of the accessed the mature association history variable of the particular matched PSR track corresponding to previous association with the particular SSR report is less than maximum value M, the value is incremented, otherwise the value remains at M. At step 308e₂, association application 120 determines if the particular matched PSR track has any tentative association history variables (i.e., association history variables corresponding to previous associations between the matched PSR track and identification information other than that of the particular SSR report) having values greater than zero. For those tentative association history variables having a value greater than zero, the value is decremented, otherwise, the tentative association history variable is deleted (i.e., tentative association history variables having a value equal to zero are deleted).

If association application 120 associates the particular SSR report with a particular matched PSR track in steps 306 and 308, the method returns to step 304 and association application 120 accesses another particular SSR report of SSR plot 136b. If association application 120 does not associate the particular SSR report with a particular matched PSR track in steps 306 and 308, the method continues to step 310.

At step 310 association application 120 determines the distance between the particular SSR report (i.e., a location indicate by the location information of the particular SSR report) and each PSR track of the received PSR track information 136a'.

More particularly, at step 310a association application 120 accesses a particular PSR track. At step 310b association application 120 determines the distance between the particular SSR report and the accessed particular PSR track. At step 310c association application 120 determines if the distance between the accessed particular PSR track and the particular SSR report is less than a minimum threshold distance minDist (which may be predefined to be any suitable distance). For example, minDist may be defined to be a distance greater than $D_m$. If it is determined that the distance between the particular SSR report and the particular PSR track is not less than the distance minDist, the method returns to step 310a and association application 120 accesses another PSR report of PSR track information 136a'. If it is determined that the distance between the particular SSR report and the particular PSR track is less than the distance minDist, the method continues to step 310d.

At step 310d association application 120 determines if the accessed particular PSR track (1) does not have any corresponding tentative association history variables, (2) does have a corresponding tentative association history variable corresponding to previous associations with the identification information of the particular SSR report, or (3) the distance between the particular SSR report and the accessed particular PSR track is less than the previous minDist regardless of the tentative association history.

If association application 120 determines that none of (1)-(3) are true, the method returns to step 310a and association application 120 accesses another PSR track. If association application 120 determines that any of (1)-(3) are true, the method continues to step 310e. At step 310e association application 120 determines that the particular SSR report is associated with the particular PSR track. Additionally, at step 310f association application 120 updates the minDist to be equal to the distance between the accessed particular PSR track and the particular SSR report.

If association application 120 does not associate the particular SSR report with a particular PSR track in step 310 (i.e., the particular SSR report is sufficiently far from each PSR track of PSR track information 136a' such that the particular SSR report is not considered to be associated with any of the PSR tracks), the method returns to step 304 and association application 120 accesses another particular SSR report of SSR plot 136b. If association application 120 associates the particular SSR report with a particular PSR track in steps 310, the method continues to step 312.

At step 312 association application 120 accesses and updates each association history variable of the particular PSR track with which the particular SSR report was associated in step 310, as described above. More particularly, at step 312a association application 120 determines if the particular PSR track (PSR track with which the particular SSR report was associated in step 310) has a mature association history variable corresponding to previous associations with the identification information of the particular SSR report. In other words, association application 120 determines if the particular PSR track is a matched PSR track (as determined in step 306) having a distance from the particular SSR report greater than $D_m$ (such that the particular PSR track was not associated with the particular SSR report at step 308) but less than minDist. If association application 120 determines at step 312a that the particular PSR track does have a mature association history variable corresponding to previous associations with the identification information of the particular SSR report, the method continues to step 312b.

At step 312b, association application 120 updates each association history variable of the particular PSR track with which the particular SSR report was associated in step 310, as described above. More particularly, at step $312b_1$ association application 120 determines if the value of the mature association history of the particular matched the PSR track (i.e., corresponding to previous associations with the location information of the particular SSR report) is less than the maximum value M (which may be predefined as any suitable value, as described above). If the value of the accessed the mature association history variable of the particular PSR track is less than maximum value M, the value is incremented, otherwise the value remains equal to M. At step $312b_2$, association application 120 determines if the particular PSR track has any tentative association history variables (i.e., association history variables corresponding to previous associations between the particular PSR track and identification information other than that of the particular SSR report) having values greater than zero. For tentative association history variables having values greater than zero, the value is decremented, otherwise, the association history variable is deleted (i.e., tentative association history variables having a value equal to zero are deleted).

If association application 120 determines at step 312a that the particular PSR track does not have a mature association history variable corresponding to previous associations with the location information of the particular SSR report, the method continues to step 312c. At step 312c, association application 120 updates each association history variable of the particular PSR track with which the particular SSR report was associated in step 310, as described above. More particularly, at step $312c_1$ association application 120 saves the determined minDist (equal to the determined distance between the particular SSR report and the PSR track with which the particular SSR report was associated, as described above) as part of the association history variable corresponding to previous associations between the particular PSR track and the location information of the particular SSR report.

At step $312c_2$, association application 120 determines if the particular PSR track with which the particular SSR report was associated in step 310 has a mature association history variable corresponding to previous associations between the particular PSR track and identification information other than that of the particular SSR report. If it is determines that the particular PSR track has a mature association history variable corresponding to associations between the particular PSR track and identification information other than that of the particular SSR report, the value of the mature association history variable is decreased (if the value has a value greater than zero) or deleted (if the value has a value equal to zero).

At step $312c_3$, association application 120 determines if the particular PSR track with which the particular SSR report was associated in step 310 has a tentative association history variable corresponding to previous associations between the particular PSR track and the identification information of the particular SSR report. If it is determined that the particular PSR track does not have a tentative association history variable corresponding to previous associations between the particular PSR track and the identification information of the particular SSR report (i.e., the particular PSR track either has one or more tentative association history variables corresponding to previous associations between the particular PSR track and identification information other than that of the particular SSR report or the particular PSR track has no association history variables), association application 120 creates a new association history variable corresponding to associations between the particular PSR track and the identification information of the particular SSR report.

If it is determined that the particular PSR track does have a tentative association history variable corresponding to previous associations between the particular PSR track and the identification information of the particular SSR report, the value of the tentative association history variable is incremented.

Additionally, at step $312c_4$, in response to incrementing the value of the tentative association history variable of the particular PSR track corresponding to previous associations between the particular PSR track and the identification information of the particular SSR report in step $312c_3$, association application 120 determines if the value of the tentative association history variable is greater than a threshold value P. If the value of the incremented tentative association history variable is greater than the threshold value P, association application 120 re-classifies the tentative association history variable as a mature association history variable. If the value is less than the threshold value P, the tentative association history variable remains classified as tentative.

The method returns to step 304, and association application 120 accesses another particular SSR report of SSR plot 136b.

FIGS. 4A-4D illustrate changes in the values of a number of association history variables of a PSR track over time resulting from the application of the method for performing dual hysteresis target association described in FIG. 2 and FIGS. 3A-3C, according to certain embodiments of the present invention. Although the threshold value P defining the point at which an association history variable is classified as mature is depicted and primarily described as being equal to ten, the present invention contemplates the threshold value P being defined as any suitable value according to particular needs. Similarly, although the maximum value M defining the point at which the value of a mature association history variable will no longer be incremented is depicted and primarily described as being equal to fifteen, the present invention contemplates the maximum value M being defined as any suitable value according to particular needs.

FIG. 4A illustrates the values of an association history variable over time (the association history variable corresponding to associations between a particular PSR track and the identification information of a particular SSR report) resulting from the establishment of an association between the particular PSR track and the particular SSR report. First, association application 120 receives first PSR track information 136a' and first SSR plot 136b and associates the particular PSR track of the PSR track information 136a' with the particular SSR report of SSR plot 136b for the first time (i.e., point 402). In response to the first association between the particular PSR track and the particular SSR report, association application 120 creates a tentative association history variable for the particular PSR track corresponding to associations between the particular PSR track and the identification information of the particular SSR report (as described above).

Upon receipt of subsequent PSR track information 136a' and SSR plots 136b, association application 120 associates the particular PSR track (i.e., subsequent PSR tracks having the same track number) with the particular SSR report (i.e., subsequent SSR reports having the same identification information), incrementing the value of the tentative association history variable of the particular PSR track in response to each association. Upon receipt of tenth PSR track information 136a' and tenth SSR plot 136b, association application 120 associates the particular PSR track of the PSR track information 136a' with the particular SSR report of SSR plot 136b for the tenth consecutive time (i.e., point 404), and association application 120 increments the value of the association history variable in response to the association. Furthermore, association application 120 determines that the value of the association history variable is equal to threshold value P (ten), and re-classifies the association history variable as mature (i.e., step $312c_4$ of FIG. 3C, described above). For each receipt of subsequent PSR track information 136a' and SSR plots 136b, association application 120 associates the particular PSR track (i.e., subsequent PSR tracks having the same track number) with the particular SSR report (i.e., subsequent SSR reports having the same identification information), each time incrementing the value of the mature association history variable of the particular PSR track up to the maximum value M (at the fifteenth consecutive association).

FIG. 4B illustrates the values of an association history variable over time (the association history variable corresponding to associations between a particular PSR track and the identification information of a particular SSR report) resulting from the PSR track leaving the coverage area of PSR device 102a (i.e., PSR track information 136a' no longer includes the particular track). Upon receipt of first PSR track information 136a' subsequent PSR track leaving the coverage area (point 406), association application 120 fails to associate any SSR report of SSR plot 136b (including the particular SSR report, if present) with the particular PSR track, as the particular PSR track is no longer included in PSR track information 136a' As a result, association application 120 will decrement the value (i.e., from maximum value fifteen to fourteen) of the mature association history variable of the PSR track corresponding to associations between the particular PSR track and the identification information of the particular SSR report.

Upon receipt of subsequent PSR track information 136a' (each not including the particular PSR track), association application 120 fails to associate any SSR report of first SSR plot 136b with the particular PSR track, and, as a result, association application 120 continues to decrement the value of the mature association history variable of the PSR track corresponding to associations between the particular PSR track and the identification information of the particular SSR report until the value of the mature association history variable reaches zero (point 408), at which point the association history variable will be deleted.

FIG. 4C illustrates the values of a first association history variable of a particular PSR track over time (the first association history variable corresponding to associations between the particular PSR track and the identification information of a first SSR report) and the values of a second association history variable of a particular PSR track over time (the second association history variable corresponding to associations between the particular PSR track and the identification information of a second SSR report) resulting from a mid-flight aircraft ID change. In other words, the identification information of the first SSR report is the aircraft ID of a particular aircraft prior to the change and the identification information of the second SSR report is the aircraft ID of the same particular aircraft after the change.

Upon receipt of first SSR plot 136b subsequent to the mid-flight aircraft ID change (point 410), association application 120 associates the particular PSR track with the second SSR report for the first time. As a result, association application 120 creates second association history variable (tentative) for the particular PSR track (corresponding to associations between the particular PSR track and the identification information of the second SSR report—the aircraft ID of the particular aircraft subsequent to the aircraft ID change). Additionally, upon receipt of first SSR plot 136b subsequent to the mid-flight aircraft ID change (point 410), association application 120 fails to associate the particular PSR track with the identification information of the first SSR report (as the aircraft ID of the particular aircraft prior to the aircraft ID change no longer exists), and association application 120 decrements the value of the first association history variable (mature) of the particular PSR track (corresponding to associations between the particular PSR track and the identification information of the first SSR report—the aircraft ID of the particular aircraft prior to the aircraft ID change) from maximum value M (fifteen) to fourteen).

Upon receipt of subsequent SSR plots 136b, association application 120 associates the particular PSR track with identification information of the second SSR report, and, as a result, association application 120 increment the value of the second association history variable while decrementing the value of the first association history variable. Upon receipt of tenth SSR plots 136b subsequent to the aircraft ID change, association application 120 associates the particular PSR track with the identification information of the second SSR report for the tenth consecutive time (i.e., point 414), and association application 120 increments the value of the second association history variable of the particular PSR track in response to the association. Furthermore, association application 120 determines that the value of the second association history variable of the particular PSR track is equal to threshold value P (ten), and association application 120 re-classifies the association history variable as mature (step 414). Furthermore, association application 120 deletes the first association history variable in response to the re-classification of the second association history variable as mature.

FIG. 4D illustrates the values of a first (mature) association history variable of a particular PSR track over time (the first association history variable corresponding to associations between the particular PSR track and the identification information of a first SSR report), the values of a second (tentative) association history variable of a particular PSR track over time (the second association history variable corresponding to associations between the particular PSR track and the identification information of a second SSR report), and the values of a third (tentative) association history variable of a particular PSR track over time (the third association history variable corresponding to associations between the particular PSR track and the identification information of a third SSR report) resulting from formation flight.

Upon receipt of each PSR track information 136a' (including the particular aircraft track) and SSR plot 136b (including identification information of the first, second, and third SSR reports), association application 120 associates the particular aircraft track with the identification information of the first SSR report, the identification information of the second SSR report, or the identification information of the third SSR report (as described above) and increments/decrements the values of the first, second, and third association history variable accordingly.

For example, association application 120 may receive first PSR track information 136a' (including the particular PSR track) and first SSR plot 136b (including identification information of the first, second, and third SSR reports). Association application 120 may associate the particular PSR track with the identification information of the second SSR report for the first time (point 416). Additionally, as a result of the association of the particular PSR track with the identification information of the second SSR report for the first time, association application 120 may generate the second (tentative) association history variable and decrement the first (mature) association history variable.

Association application 120 may subsequently receive second through seventh PSR track information 136a' and second through seventh SSR plots 136b, associating the particular PSR track with the identification information of the second SSR report for each set of received PSR track information 136a'/SSR plot 136b (incrementing the value of the second (tentative) association history variable up to a value of seven and decrementing the value of the first (mature) association history variable down to a value of eight).

Association application 120 may receive eight through eleventh PSR track information 136a' and eight through eleventh SSR plots 136b, associating the particular PSR track with the identification information of the first SSR report for each set of received PSR track information 136a'/SSR plot 136b (incrementing the value of the first (mature) association history variable up to a value of eleven).

Association application 120 may receive twelfth PSR track information 136a' and twelfth SSR plot 136b. Association application 120 may associate the particular PSR track with the identification information of the third SSR report for the first time (point 418). Additionally, as a result of the association of the particular PSR track with the identification information of the third SSR report for the first time, association application 120 may generate the third (tentative) association history variable (which replaces the second association history variable) and decrement the first (mature) association history variable.

Association application 120 may receive thirteenth through seventeenth PSR track information 136a' and thirteenth through seventeenth SSR plots 136b, associating the particular PSR track with the identification information of the third SSR report for each set of received PSR track information 136a'/SSR plot 136b (incrementing the value of the third (tentative) association history variable up to a value of five and decrementing the value of the first (mature) association history variable down to a value of six).

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A method, comprising:
receiving first track information comprising data for a particular aircraft track;
receiving a first radar plot, comprising:
first location information corresponding to first aircraft identification information; and
first location information corresponding to second aircraft identification information;
associating, using one or more computer processing modules, the first aircraft identification information with the particular aircraft track;
accessing, from one or more non-transitory computer memory modules, historical association information comprising a first association history variable corresponding to one or more previous associations between the first aircraft identification information and the particular aircraft track and a second association history variable corresponding to one or more previous associations between the second aircraft identification information and the particular aircraft track; and
updating, using the one or more computer processing modules, the first association history variable in response to the association of the first aircraft identification information with the particular aircraft track.

2. The method of claim 1, wherein associating the first aircraft identification information with the particular aircraft track comprises:
determining that the first association history variable has a mature classification;
determining a distance between a first location indicated by the first location information corresponding to the first aircraft identification information and the particular aircraft track; and
determining that the distance between the first location and the particular aircraft track is less than a threshold minimum distance.

3. The method of claim 1, wherein associating the first aircraft identification information with the particular aircraft track comprises:
determining a distance between a first location indicated by the first location information corresponding to the first aircraft identification information and the particular aircraft track; and
determining that the distance between the first location and the particular aircraft track is less than a threshold minimum distance.

4. The method of claim 1, wherein:
the method comprises updating the second association history variable in response to the association of the first aircraft identification information with the particular aircraft track;
updating the first association history variable in response to the association of the first aircraft identification information with the particular aircraft track comprises incrementing a value of the first association history variable; and
updating the second association history variable in response to the association of the first aircraft identification information with the particular aircraft track comprises decrementing a value of the second association history variable.

5. The method of claim 4, comprising:
classifying, based on a determination that the value of the first association history variable is greater than a threshold value, the first association history variable as mature; and
displaying, based on the classification of the first association history variable as mature, the first aircraft identification information with the particular aircraft track on a radar display.

6. The method of claim 4, comprising:
receiving second track information comprising data for the particular aircraft track;
receiving a second radar plot, comprising:
second location information corresponding to the first aircraft identification information; and
second location information corresponding to the second aircraft identification information;
associating, using the one or more computer processing modules, the second aircraft identification information with the particular aircraft track;
accessing, from the one or more non-transitory computer memory modules, historical association information comprising the updated first association history variable and the updated second association history variable;
updating, using the one or more computer processing modules, the updated first association history variable in response to the association of the second aircraft identification information with the particular aircraft track; and
updating, using the one or more computer processing modules, the updated second association history variable in response to the association of the second aircraft identification information with the particular aircraft track.

7. The method of claim 6, wherein:
updating the updated first association history variable in response to the association of the second aircraft identification information with the particular aircraft track comprises decreasing the value of the updated first association history variable; and
updating the updated second association history variable in response to the association of the second aircraft identification information with the particular aircraft track comprises increasing the value of the updated second association history variable.

8. A system, comprising:
one or more memory modules operable to store historical association information comprising a first association history variable corresponding to one or more previous associations between first aircraft identification information and a particular aircraft track and a second association history variable corresponding to one or more previous associations between second aircraft identification information and the particular aircraft track; and
one or more processing units operable to:
receive first track information comprising data for the particular aircraft track;
receive a first radar plot, comprising:
first location information corresponding to the first aircraft identification information; and
first location information corresponding to the second aircraft identification information;
associate the first aircraft identification information with the particular aircraft track;
access the historical association information comprising the first association history variable and the second association history variable; and
update the first association history variable in response to the association of the first aircraft identification information with the particular aircraft track.

9. The system of claim 8, wherein the one or more processing units are operable to associate the first aircraft identification information with the particular aircraft track by:
determining that the first association history variable has a mature classification;
determining a distance between a first location indicated by the first location information corresponding to the first aircraft identification information and the particular aircraft track; and
determining that the distance between the first location and the particular aircraft track is less than a threshold minimum distance.

10. The system of claim 8, wherein the one or more processing units are operable to associate the first aircraft identification information with the particular aircraft track by:
determining a distance between a first location indicated by the first location information corresponding to the first aircraft identification information and the particular aircraft track; and
determining that the distance between the first location and the particular aircraft track is less than a threshold minimum distance.

11. The system of claim 8, wherein:
the one or more processing units are operable to update the first association history variable in response to the association of the first aircraft identification information with the particular aircraft track by incrementing a value of the first association history variable; and
the one or more processing units are operable to update the second association history variable in response to the association of the first aircraft identification information with the particular aircraft track by decrementing a value of the second association history variable.

12. The system of claim 11, wherein the one or more processing units are operable to:
classify, based on a determination that the value of the first association history variable is greater than a threshold value, the first association history variable as mature; and
display, based on the classification of the first association history variable as mature, the first aircraft identification information with the particular aircraft track on a radar display.

13. The system of claim 11, wherein the one or more processing units are operable to:
receive second track information comprising data for the particular aircraft track;
receive a second radar plot, comprising:
second location information corresponding to the first aircraft identification information; and
second location information corresponding to the second aircraft identification information;
associate the second aircraft identification information with the particular aircraft track;
access historical association information comprising the updated first association history variable and the updated second association history variable;
update the updated first association history variable in response to the association of the second aircraft identification information with the particular aircraft track; and
update the updated second association history variable in response to the association of the second aircraft identification information with the particular aircraft track.

14. The system of claim 13, wherein the one or more processing units are operable to:
- update the updated first association history variable and the updated second association history variable in response to the association of the second aircraft identification information with the particular aircraft track by decreasing the value of the updated first association history variable; and
- update the updated second association history variable and the updated second association history variable in response to the association of the second aircraft identification information with the particular aircraft track by increasing the value of the updated second association history variable.

15. Software embodied in a non-transitory computer-readable medium and when executed operable to perform operations comprising:
- receiving first track information comprising data for a particular aircraft track;
- receiving a first radar plot, comprising:
  - first location information corresponding to first aircraft identification information; and
  - first location information corresponding to second aircraft identification information;
- associating the first aircraft identification information with the particular aircraft track;
- accessing historical association information comprising a first association history variable corresponding to one or more previous associations between the first aircraft identification information and the particular aircraft track and a second association history variable corresponding to one or more previous associations between the second aircraft identification information and the particular aircraft track; and
- updating the first association history variable in response to the association of the first aircraft identification information with the particular aircraft track.

16. The software of claim 15, wherein associating the first aircraft identification information with the particular aircraft track comprises:
- determining that the first association history variable has a mature classification;
- determining a distance between a first location indicated by the first location information corresponding to the first aircraft identification information and the particular aircraft track; and
- determining that the distance between the first location and the particular aircraft track is less than a threshold minimum distance.

17. The software of claim 15, wherein associating the first aircraft identification information with the particular aircraft track comprises:
- determining a distance between a first location indicated by the first location information corresponding to the first aircraft identification information and the particular aircraft track; and
- determining that the distance between the first location and the particular aircraft track is less than a threshold minimum distance.

18. The software of claim 15, wherein:
- the one or more processing units are operable to update the second association history variable in response to the association of the first aircraft identification information with the particular aircraft track;
- updating the first association history variable in response to the association of the first aircraft identification information with the particular aircraft track comprises incrementing a value of the first association history variable; and
- updating the second association history variable in response to the association of the first aircraft identification information with the particular aircraft track comprises decrementing a value of the second association history variable.

19. The software of claim 18, operable when executed to perform operations comprising:
- classifying, based on a determination that the value of the first association history variable is greater than a threshold value, the first association history variable as mature; and
- displaying, based on the classification of the first association history variable as mature, the first aircraft identification information with the particular aircraft track on a radar display.

20. The software of claim 18, operable when executed to perform operations comprising:
- receiving second track information comprising data for the particular aircraft track;
- receiving a second radar plot, comprising:
  - second location information corresponding to the first aircraft identification information; and
  - second location information corresponding to the second aircraft identification information;
- associating the second aircraft identification information with the particular aircraft track;
- accessing historical association information comprising the updated first association history variable and the updated second association history variable;
- updating the updated first association history variable in response to the association of the second aircraft identification information with the particular aircraft track; and
- updating the updated second association history variable in response to the association of the second aircraft identification information with the particular aircraft track.

21. The software of claim 20, wherein:
- updating the updated first association history variable in response to the association of the second aircraft identification information with the particular aircraft track comprises decreasing the value of the updated first association history variable; and
- updating the updated second association history variable in response to the association of the second aircraft identification information with the particular aircraft track comprises increasing the value of the updated second association history variable.

* * * * *